(12) United States Patent
Yang

(10) Patent No.: US 9,119,087 B2
(45) Date of Patent: Aug. 25, 2015

(54) SYSTEMS AND METHODS FOR HYBRID WIRELESS CONTENT DELIVERY

(71) Applicant: Liuyang Lily Yang, Portland, OR (US)

(72) Inventor: Liuyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 13/629,739

(22) Filed: Sep. 28, 2012

(65) Prior Publication Data

US 2014/0092730 A1    Apr. 3, 2014

(51) Int. Cl.
*H04L 12/26* (2006.01)
*H04W 28/02* (2009.01)

(52) U.S. Cl.
CPC .................................. *H04W 28/0226* (2013.01)

(58) Field of Classification Search
None
See application file for complete search history.

(56) References Cited

U.S. PATENT DOCUMENTS

| | | | |
|---|---|---|---|
| 2002/0021792 A1* | 2/2002 | Shimizu et al. | 379/201.01 |
| 2002/0092026 A1 | 7/2002 | Janniello et al. | |
| 2005/0148342 A1* | 7/2005 | Sylvain | 455/456.3 |
| 2008/0052745 A1* | 2/2008 | Li et al. | 725/58 |
| 2008/0222705 A1* | 9/2008 | Goodmon et al. | 726/4 |
| 2009/0088188 A1* | 4/2009 | Wormald et al. | 455/466 |
| 2010/0115035 A1* | 5/2010 | Malhar et al. | 709/206 |
| 2010/0261424 A1* | 10/2010 | Mittal et al. | 455/3.01 |
| 2011/0165889 A1* | 7/2011 | Fiatal et al. | 455/456.1 |
| 2013/0191928 A1* | 7/2013 | Yin et al. | 726/27 |

FOREIGN PATENT DOCUMENTS

| | | | |
|---|---|---|---|
| JP | 2002-189908 A | 7/2002 | |
| JP | 2006-221646 A | 8/2006 | |
| KR | 10-2010-0106038 A | 10/2010 | |
| KR | 10-2012-0026781 A | 3/2012 | |

OTHER PUBLICATIONS

International Search Report and Written Opinion received for Patent Application No. PCT/US2013/047502, mailed on Oct. 25, 2013, 15 pages.

* cited by examiner

*Primary Examiner* — Otis L Thompson, Jr.
(74) *Attorney, Agent, or Firm* — Sutherland Asbill & Brennan LLP

(57) ABSTRACT

A method comprising transmitting a request, by a mobile device, indicating one or more content items; determining a location for the mobile device, by a processor; establishing a connection with a transmission medium, based at least in part on the indicated one or more content items, if the indicated one or more content items is not on the mobile device, wherein the transmission medium includes a digital radio tower, a long range radio tower and a wireless access point; and activating the indicated one or more content items, if the indicated one or more content items is on the mobile device.

24 Claims, 12 Drawing Sheets

SYSTEMS AND METHODS FOR HYBRID WIRELESS CONTENT DELIVERY

TECHNICAL FIELD

The present disclosure relates generally to network service, and more particularly, to systems and methods for delivering content to wireless devices.

BACKGROUND

Electronic devices, such as wireless devices, often transmit and receive data or content items, such as songs, smart phone applications, video clips, streaming video, software updates, etc., from many servers over networks. The delivery of such content items usually takes place over multiple connected networks, including cellular networks that provide access to the Internet, to which most of the servers containing this content are connected. The servers that maintain this content can also deliver it to the wireless devices. As the size and download frequency of such content increases, the delivery of that content consumes a larger amount of the available network bandwidth, taxing the network and often resulting in poor consumer experiences. To address this issue, cache servers have been deployed at the edge of certain networks to form content distribution networks (CDNs). By storing particular content items, such as the most popularly downloaded content items, on the CDN, user requests for these content items may be served from the edge of the network, reducing network load and response time. Similar caching techniques can also be utilized at cellular base stations to reduce the load on cellular networks. While caching certain content at the edges of a network and at base stations may reduce the network traffic and overall network loads, it does not address the congestion and loads caused by the delivery of such content over the "last mile." For example, even though these techniques may be implemented, wireless access congestion due to limited capacity in cellular access networks may still occur frequently.

BRIEF DESCRIPTION OF THE FIGURES

Reference will now be made to the accompanying drawings, which are not necessarily drawn to scale, and wherein.

DETAILED DESCRIPTION

Figure 1:
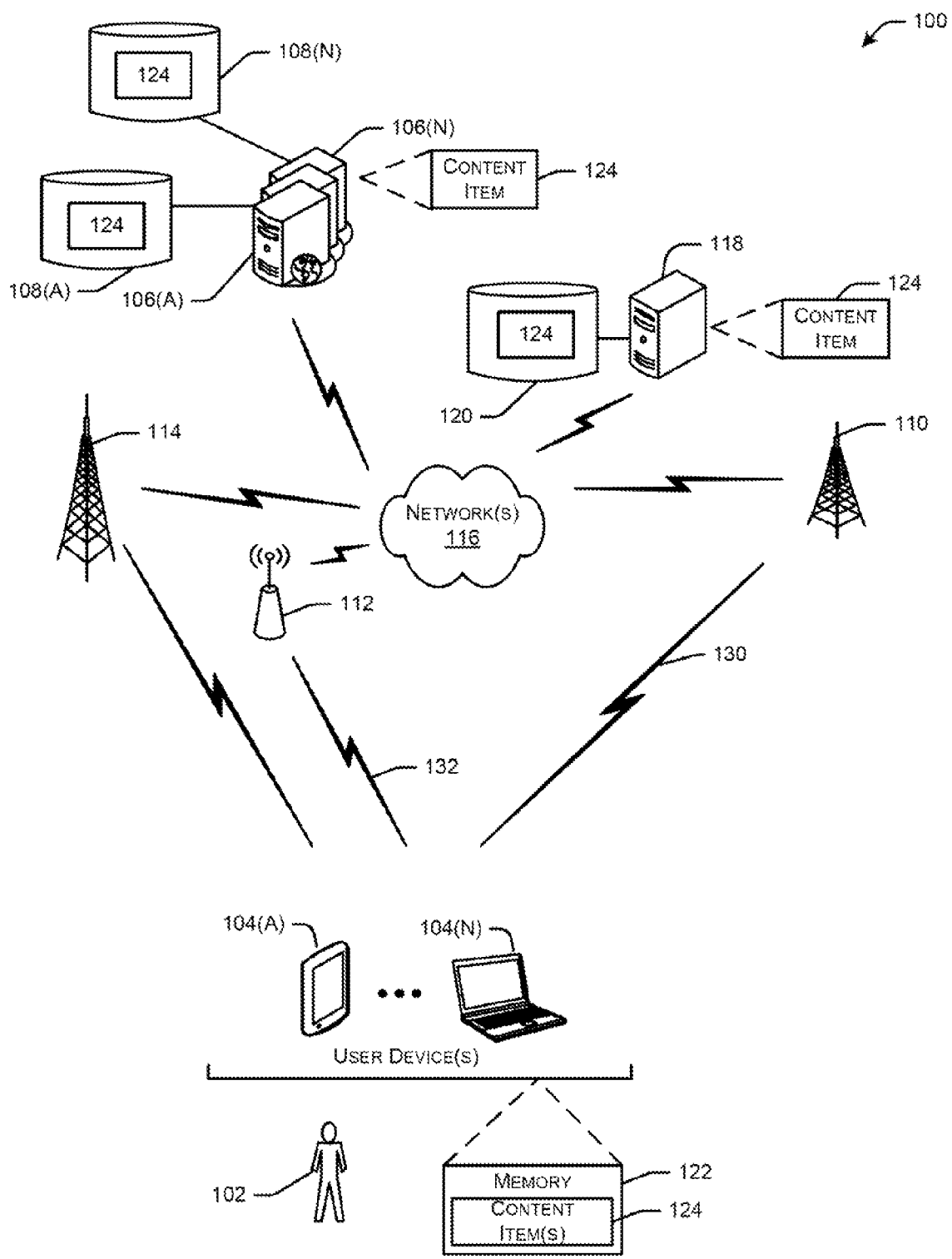
FIG. 1 is a schematic illustration of an example hybrid wireless content delivery system in accordance with an embodiment of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may provide systems and methods for delivering content to wireless devices. Many wireless devices, such as mobile communications devices, cellular phones, smart phones, portable gaming devices, laptops, tablet computers, etc., are equipped to connect to different wireless network platforms, such as WI-FI networks, cellular networks or other networks, that provide access to the Internet. These wireless devices, also referred to herein as "user devices," and individually as a "user device," may access web servers connected to the Internet to download data, often times in the form of content such as an audio file, a video file, a program executable file (e.g., an application software, also referred to as an app), a game, an image file, a text file, etc. In certain instances, the content is purchased (for example, a song) and in other instances it is merely requested (for example, a song clip or sample). These downloads may consume relatively large volumes of bandwidth, and may be downloaded utilizing various communication protocols, for example, WI-FI, direct WI-FI, BLUETOOTH®, Bluetooth Low Energy (BLE), cellular, THIRD GENERATION CELLULAR (3G), FOURTH GENERATION CELLULAR (4G), Long Term Evolution (LTE), Worldwide Interoperability for Microwave Access (WiMAX), or combinations thereof. However, cellular providers, which may utilize the data transfer capability of 3G, 4G, and LTE, may restrict the amount of data a user may download, such as only 50 GB of data per month or 240 kilobytes per minute, and/or the provider may charge the user based on the amount of data downloaded, such as $0.25 per kilobyte.

Of interest, DBR (digital broadcast radio) systems are becoming more popular, in part, due to the ability to broadcast both audio and data via a digital signal, increasing the bandwidth a station may broadcast, and thereby providing additional streams of potential income. For instance, HD Radio (high definition radio, a digital radio technology approved in the United States) is utilized by more than 2,000 radio stations and covers more than 90% of the population in the United States. HD Radio can provide up to about 300 kilobits per second, though most radio stations that offer HD Radio subdivide their data stream into sub-channels of varying data rates. Often the radio station will continue to transmit an analog signal, but will also transmit one or more digital sub-channels, all contained within the same 400 kHz of bandwidth assigned to an FM station. Using the unused sub-channels, a radio station may broadcast virtually any data, such as one or more content items. For example, one manufacturer of portable GPS devices uses HD Radio systems to transmit traffic information to its devices, essentially paying the HD Radio enabled stations to transmit the data. Because of this, manufacturers of various types of electronic devices are incorporating DBR chips sets into their devices to take advantage of the increased functionality associated with DBR systems, such as HD Radio.

Note that a few DBR standards have been developed and adopted by different parts of the world. While HD Radio is widely adopted in North America and Latin America, Digital Audio Broadcast (DAB)/DAB±/DMB (Digital Multimedia Broadcast) is adopted in Australia, the UK and Western Europe, and DRM (Digital Radio Mondiale) is being considered by Russia, India, etc.

In accordance with an embodiment of the disclosure, certain content items that may have been broadcast in a digital broadcast radio (DBR) signal may be received by a user device that includes a suitable DBR receiver and processor. The content items may be processed and stored locally on the user device. However, these content items may remain inactive until needed. Upon the user requesting or purchasing a content item, the user device can check to see if the content item is already on the user device, and if so, the user device can activate the content item. If the content item is not already located on the user device, the user device may communicate with a network server, and retrieve the content from the network server or an alternative cache server, depending on where the content may be stored. In this manner, the access network may not be taxed with the data transfer to the wireless device if the content is preloaded on the user device. The user experience can be positive because there may be essentially no delay associated with using the preloaded content item requested/purchased, and in certain circumstances, the user may avoid cellular data use charges levied by the cellular data provider. In one aspect, the selection of what content items to broadcast in a given DBR signal may be based on content item popularity (e.g., on a national, regional, and/or local level), size of the content item, availability for download via alternative platforms, etc.

In an illustrative example, a user may wish to purchase a specific content item, such as a song. In this example, the user device may be connected to a platform suitable for interfacing with a website or app store, such as via a web browser running on the wireless device, a dedicated app running on the wireless device, or any other suitable interface for requesting or purchasing content stored remotely. The wireless device may utilize such an interface to purchase a content item or request a content item. In some instances, the request may be associated with a remote depository of content already owned by the user of the wireless device. The download may include a file transfer or streaming of the content, such as in the case of audio content or video content. Further, in some instances, the request may be associated with a software update. Back to the example, the user device, upon detecting the purchase or request of content, may determine if the song has already been downloaded and stored on the user device, in which case, the song may be made available (e.g., activated) once the purchase is complete and/or the request is processed (e.g., the request is confirmed as valid and/or authorized). Thus, while the purchase transaction and/or request processing, via an access network such as a WI-FI connection or cellular network connection, may require the exchange of information with a server supporting the website or app store from which the song is purchased, the relative bandwidth for the information exchange is small, and the access network is not taxed with downloading the purchased song. If, in the present example, the song is not already stored on the user device, then the user device may download the song from the remote server through an access network to which the device is connected. While in this example the content is a song, it will be appreciated based on the disclosure that the content may include data files and/or program files, wherein data files may include audio, video, text, image files, etc., and program files may be executable files designed to execute instructions on the device (e.g., an app).

By regularly broadcasting popular content items over a local DBR signal, a user device may be able to receive content items, store at least some of the content items in storage on the user device, and then have essentially immediate access to such content items upon a valid purchase or request for such content. The determination as to what content is stored by the user device and/or how long it is stored may be based on various factors, such as memory capacity, local storage capacity, preference regarding such content (e.g., store country music and software updates associated with three predetermined apps, but nothing else), etc., as may be discussed in greater detail below. The determination of what content is broadcast, its frequency of broadcast, and other parameters associated with the availability of the content (e.g., how long it may be stored without use) may be based on any number of factors, such as popularity, content size, bandwidth utilization on the local access networks, etc., as may be discussed in greater detail below.

The determination as to what content is stored by the user device, may be based, at least in part, on one or more preferences. For example, a user device may receive a set of preferences associated with content items based at least in part on prior purchases and/or requests, and/or based on user preferences set by the user of the wireless device. In one illustrative embodiment, a user may input a preference for retrieving content items. For example, if a user prefers country music, the user may input a preference in the user device to download and store any country songs, country songs recommended for that user, top country songs, etc., received on a DBR signal. Further, a preference or default setting may apply to the amount of memory made available for the downloaded content, and/or to the amount of time a content item may be stored on the user device before it is erased, for instance, to free up storage for the download of new content.

With regard to what content items are broadcast, a network server or server device may receive many requests from various users requesting various content items. In one embodiment, the server device may determine a popularity score for the various content items. The server device may also determine a popularity score for various content items, in each geographical location. For example, users in Atlanta, Ga., might request different songs to be loaded to their devices as compared to users in New York City, N.Y. Further, the DBR systems (e.g., HD Radio enabled stations) generally are configured to transmit within a relatively short range, for example, a metropolitan area. Therefore, the server device may determine one set of content items to be transferred to certain DBR systems located in New York City, and have a different set of content items be transferred to certain DBR systems in Atlanta. Furthermore, the server device may take into account strings in social media websites or news feeds to determine which content items to transfer to a DBR system. Further, the server device can instruct DBR systems to receive content items from the server device at various intervals depending on factors such as: location, popularity, total number of requests, and amount of data that can be transferred. In one illustrative example, the server device might also take into account the amount of data available for transfer (e.g., the data rate or bandwidth) at a DBR system, and customize the content items based on the transfer capacity of the digital radio broadcast system. In another illustrative example, a cache server may also transmit the content and take into account the amount of data available for transfer capacity of the digital radio broadcast system.

In another illustrative example, the server device could further have mirror servers or local cache servers that may be used to handle additional content items. In one example, data that had a high volume of requests could be transmitted to various local cache servers, and user devices could be instructed to receive data from these various sources based on their present location. Similar mechanisms may be established on cache servers to broadcast content items via broadcast media such as Digital Broadcast Radio.

It will be appreciated that while the discussion herein may be directed particularly to wireless network discovery and the establishment of a communicative connection therewith using one or more wireless mobile devices, the same systems, methods, and apparatuses may be applied to non-mobile, or stationary, electronic devices within the scope and embodiments of the disclosure. It will further be appreciated that wireless mobile devices discussed herein may be operated in any suitable environment, location, or application, such as automotive applications, personal use, military use, commercial use, or the like. Further still, it will be appreciated that while much of the discussion herein may focus on Wi-Fi or cellular networks as access networks, the systems, methods, and apparatuses disclosed herein may be applied to any suitable wireless network or point-to-point communication link, operated at any suitable frequency, wavelength, modulation technique, pre-established standard, or protocol. Non-limiting examples of such wireless networks, point-to-point connections, or ad-hoc networks may include, but are not limited to: WI-FI, direct WI-FI, BLUETOOTH, Bluetooth Low Energy (BLE), cellular, THIRD GENERATION CELLULAR (3G), FOURTH GENERATION CELLULAR (4G), Long Term Evolution (LTE), Worldwide Interoperability for Microwave Access (WiMAX), or combinations thereof.

It will be appreciated that while the discussion herein may be directed particularly to digital broadcast radio as a means of broadcasting content items, other digital broadcast media such as mobile TV broadcasts may also be used to implement the same systems, methods and apparatuses.

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale.

Referring now to FIG. 1, an example hybrid wireless content delivery system or architecture 100 is shown in accordance with embodiments of the disclosure. One or more users 102 may access architecture 100 by way of any number of user or consumer computing devices 104(A)-(N), which are used by the one or more users 102 to access content items. For example, a user device (individually referred to as user device 104) may be utilized by user 102 to access content items stored at a web server, such as web servers 106(A)-106(N), or in one or more associated content databases, such as databases 108(A)-108(N). The user device 104 may receive a content item 124 from a web server, such as 106(A), or from an associated content database, such as 108(A), via one or more mediums, such as by a cellular access network, represented by a cellular tower 110, an access point 112, or a DBR system, represented by a DBR tower 114. In certain embodiments, communications between the web server 106(A) and the cellular tower 110, the access point 112, and the DBR tower 114 may be facilitated by one or more networks 116. The networks 116 may include any one or a combination of different types of suitable communications networks, such as cable networks, the Internet, wireless networks, cellular networks, and other private and/or public networks. Furthermore the networks 116 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

In certain embodiments, the content items may be stored at the edge of at least one network 116 at a cache server 118 or an associated database 120. This may allow for more rapid access and download of content items 124 to the user devices 104. By placing the cache servers 118 at the edge of at least one network 116, and caching the most popular content items at the cache server 118, the load on the networks 116 may be reduced, and the content item may be downloaded more rapidly from the cache server 118 than from a web server 106(A)-106(N).

The user device 104 may include, but is not limited to, a personal computer, a desk top computer, a notebook computer, a laptop computer, a personal digital assistant ("PDA"), an electronic book reader (e-book reader), a tablet computing system, a pad computing system, a smart phone, a portable gaming device, or combinations thereof. The user device 104, may include one or more user input interfaces to accept a user input. The user device 104 may further be configured with network interfaces for accessing various communication protocols such as WI-FI, direct WI-FI, BLUETOOTH, BLE, cellular, 3G, 4G, LTE, or WiMAX, as may be utilized to communicate with the cellular tower 110 and the access point 112. The user device 104 may include a memory 122 in which one or more content items 124 may be stored. In addition, the user device 104 may include suitable hardware and software to enable the reception and processing of digital radio signals, such as from DBR tower 114, which is discussed in more detail below in connection with FIG. 3.

Examples of content items 124 may be applications specific to the user device 104. Content items 124 may also include data files, audio or video content, software (applications and/or updates), etc. For example, many smart phones and tablet computers have applications that can be retrieved and executed on the user device 104.

The web server 106 or the cache server 118 may receive requests for various content items 124 from various users. In one example, a user's request for a specific content item may be transmitted 132 from a user device, such as 104(A), via the access point 112 and networks 116 to a web server, such as 106(A). The web server 106(A) may track the total number of requests for each available content item 124 in the content database 108(A). Based on any number of received requests for the users 102, the web server 106(A) may create a broadcast list for the DBR tower 114 (where the DBR system may include transmit towers). The broadcast list can list the content items 124 that may be transmitted to various DBR 114. The parameters for determining the broadcast list will be discussed further in FIGS. 3-6. Some examples of the parameters may include: total number of users requesting a content item, trends in social media, geographic location of the DBR towers 114 (such as the location of the transmitting towers), etc.

In the above example, the web server 106(A) or the cache server 118 may transmit the broadcast list to the DBR tower 114. The DBR tower 114 may periodically transmit the content items on the broadcast list to the users 102. The DBR tower 114 can have a carousel of data, where the DBR tower 114 rotates the content it broadcasts at periodic intervals. The web server 106(A) may also instruct the DBR 114 to rotate the list based on available bandwidth, and may have a carousel of broadcast lists that periodically broadcasts throughout the day, allowing many users to receive the content items 124 simultaneously, without utilizing a long-range wireless radio signal 130 or receiving content from cellular towers 110. In another embodiment, the user device 104 may periodically scan for a visible signal from a DBR tower 114 to retrieve content items on the broadcast list.

In another illustrative example, the web server 106(A) may also transmit the content items 124 to a cache server 118 and a cache database 120. The user device 104 may also retrieve content items from the cache server 118 and cache database 120. The same mechanism described above for the web server 106(A) can be used for the cache server 118 as well to put the most popular content on the broadcast list and use a broadcast media such as Digital Broadcast Radio to broadcast to all of the user devices 104.

Figure 2:
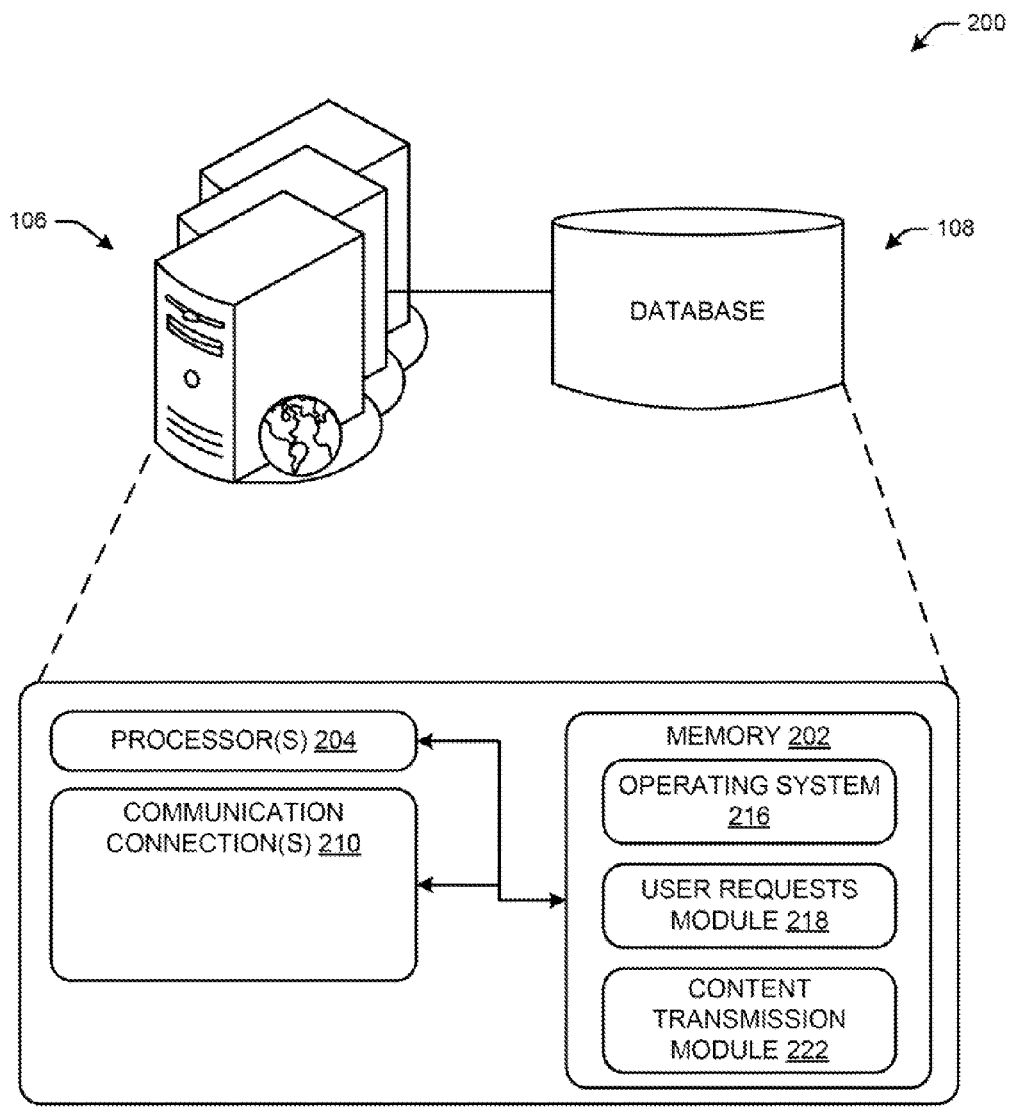
FIG. 2 is a schematic illustration of an example network server configured for hybrid wireless content delivery in accordance with an embodiment of the disclosure.

FIG. 2 is an schematic diagram of an example web server configuration 200 used in the hybrid wireless content delivery system of FIG. 1. The configuration 200 can include the web server 106 and database 108 which may contain one or more processor(s) 204 (referred to collectively as processor 204). The same configuration also may apply to the cache server 118. The processor 204 may transmit and receive content items 124 from the database 108. The processor 204 may be communicatively connected to a memory 202. User requests for one or more content items 124 may be received via one or more communication connections 210. The one or more communication connections 210 may allow the web server 106 to communicate with the content database 108, other computing devices or servers, user terminals, and/or other devices on the network 116.

In certain embodiments, the memory 202 may include any number of suitable memory devices, such as caches, read-only memory devices, random access memory ("RAM"), flash memory devices, electrically erasable programmable read-only memory ("EEPROM"), non-volatile RAM ("NVRAM"), universal serial bus ("USB") removable memory, magnetic storage devices, removable storage devices (e.g., memory cards, etc.), and/or non-removable storage devices. As desired, the memory 202 may include internal memory devices and/or external memory devices. The memory 202 may store data, executable instructions, and/or various program modules utilized by the processor 204. Examples of data that may be stored by the processor 204 may include data files such as music files, audio files, video files, and program modules.

Further referring to FIG. 2, the processor 204 may communicate with the memory 202. The memory 202 may contain a user requests module 218. The user requests module 218 may be a hardware, software, or firmware implementation. A software or firmware implementation of the user requests module 218 may include computer-executable or machine-executable instructions written in any suitable programming language to perform the various functions described herein. In one embodiment, the user requests module 218 may receive requests from users through one or more communication connections 210. For example, if a user 102 requests a "GAME" to be downloaded onto his or her user device 104, the request may be initiated by the user device 104, and transmitted via the networks 116 to the web server 106(A). The one or more communication connections 210 may receive the request for the "GAME" from the user device 104. The request can be processed by the user requests module 218 to obtain transactional information associated with the user 102. If the "GAME" is a content item that must be purchased, the user requests module 218 may be configured to transmit purchasing information, such as credit card information, that may be stored in memory 202 or the content database 108. In one embodiment, once the user requests module 218 processes the transactional information, the user requests module 218 may communicate with a content transmission module 222 to determine the transmission mode of the content items. If the content item "GAME" is already on the user device 104 due to early broadcast by the DBR, the user request coming into the web server should bear some kind of indication that the requested item "GAME" is already on the user device, and the credit information is collected to complete the transaction. The user requests module 218 may be configured to transmit an indication or authorization to the user device 104 after the credit card information is verified and proper billing is completed. For example, the user requests module 218 may be configured to transmit a token, an activation code, or other similar transmissions to the user device 104 to activate the "GAME" that is already stored or the user device 104, such as in memory 202.

In another embodiment, if the "GAME" is not already located on the user device 104, such as in memory 202, the content transmission module 222 can either transmit the content of the "GAME" to the user device 104, or transmit an indication to the user device 104 with a time stamp of the future transmission of the "GAME" content via the DBR tower 114 to the user device 104, if such delayed transmission is deemed acceptable.

In another embodiment, the content transmission module 222 may also determine the content items 124 to be placed in one or more broadcast lists. For example, certain types of music may be more popular in certain areas, and thus different types of music may be placed in different broadcast lists according to popularity, location of the DBR, total number of requests that users initiate, etc. The content transmission module 222 may determine a schedule and a time for which different content items 124 are transmitted via various transmission modes, and further may also decode or otherwise format the signals for various content items 124 to be transmitted via various transmission modes. For example, one transmission mode, such as the digital broadcast radio mode, may have a certain data capacity to carry data. Therefore, the content transmission module 222 may compress the signal to a DBR tower, such as 114, such that a suitable data stream can be transmitted within the capacity of the digital broadcast radio mode.

Figure 3:
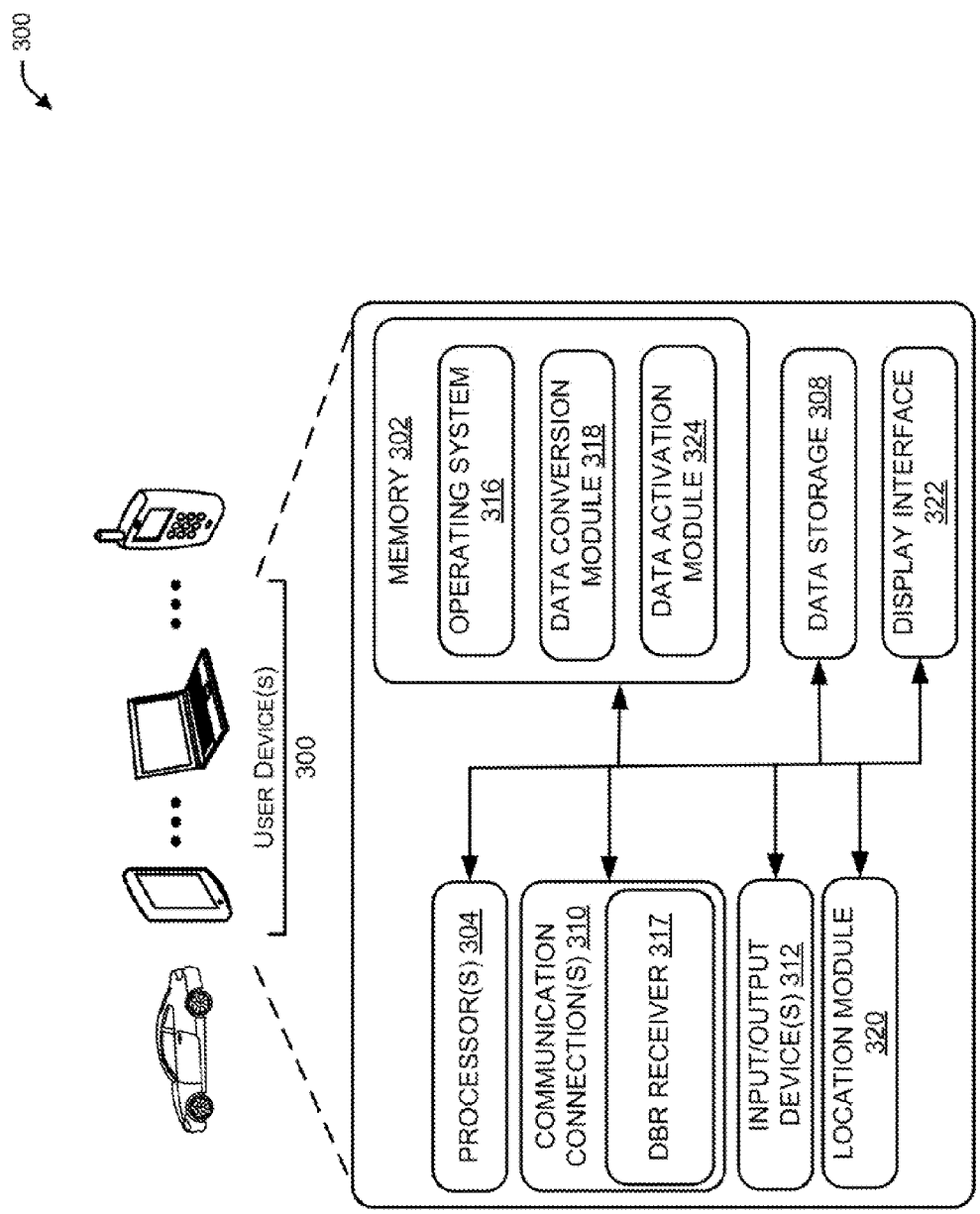
FIG. 3 is a schematic illustration of an example user device configured for hybrid wireless content delivery in accordance with an embodiment of the disclosure.

Referring now to FIG. 3, an example of a user device 300 used for hybrid wireless content delivery is shown. In one embodiment, the user device 104 may include one or more processors 304 communicatively coupled to one or more memories 302, and one or more input/output devices 312, which may include a keyboard, mouse, pen, voice input device, touch input device, gesture input device, printer, speaker, display screen, etc. The user device 104 may also include a means to receive the digital data broadcast by certain broadcast media such as a DBR receiver 317. In some embodiments, the processor 304 may also include a digital radio receiver to receive and decode DBR data. In certain embodiments, the memory 302 may include any number of suitable memory devices, such as caches, read-only memory devices, random access memory ("RAM"), flash memory devices, electrically erasable programmable read-only memory ("EEPROM"), non-volatile RAM ("NVRAM"), universal serial bus ("USB") removable memory, magnetic storage devices, removable storage devices (e.g., memory cards, etc.), and/or non-removable storage devices. Additional data capacity may be provided by data storage 308. In certain embodiments, the user device 104 may include one or more chips that include both processing and memory components. As desired, the memory 302 may include internal memory devices and/or external memory devices. The memory 302 may store data, executable instructions, and/or various program modules utilized by the processor 304. Examples of data that may be stored by the processor 304 may include data files such as music files, audio files, and video files. Other examples may include any number of suitable program modules and/or applications, including music files, audio files, video files, program files, etc.

In one embodiment, the memory 302 can also store one or more user preferences. The user preferences may be used to determine one or more content items to download to the user device 104. For example, one user may have a bandwidth restriction for the total number of gigabytes that can be downloaded from a particular transmission mode, such as by DBR or by a cellular network. One or more preferences that could indicate a user preference to download non-urgent content items only when the user device 104 is connected to a wireless access point or DBR mode can be stored in memory 302. By way of another example, another user might be a frequent traveler and may have the ability to obtain a variety of content items via digital radio broadcast. Thus that user may be able to set a user preference in the user device 104 that downloads all content items via digital radio broadcast. In yet another example, a battery associated with a user device 104 may require frequent recharge because scanning for digital radio broadcasts may be power intensive. Thus, a user 102 may set one or more user preferences to download content items based on available power for the user device 104, available networks, user location, and any other preferences.

In one embodiment, the memory 302 can store user preferences based at least in part on prompts to a user 102 for a selection of a specific preference, such as how fast the user wants a content item or the preferred source for a content item. In this example, a user can interact with any number of input/output devices to select or input any number of user preferences.

In one embodiment, the memory 302 can store user preferences based on learning behaviors from a user 102. These types of preferences can be based on any number of patterns of user inputs, actions, keystrokes, etc.

In one embodiment, the memory 302 may include an operating system 316 to manage and execute applications stored therein as well as other systems and modules within the user device 300. For example, the user device 300 may include a display interface 322 that enables a user 102 to view content displayed by the device or to interact with the user device 300 via any number of interfaces such as a keyboard, display screen, touch screen, voice input, gesture input device, and/or mouse. The operating system 316 may also interface with the communication connections 310, such as a network interface module. The communication connection 310 may include a wireless interface connection that may enable the user device 300 to communicate wirelessly with any number of other devices and servers, such as a web server 106. The wireless interface connection may include the hardware and software to broadcast and receive messages either using the Wi-Fi Direct Standard (See; Wi-Fi Direct specification published in October 2010) and/or the IEEE 802.11 wireless standard (See; IEEE 802.11-2007, published Mar. 8, 2007; IEEE 802.11n-2009, published October 2009) or a combination thereof. The wireless interface connection may include a transmitter and a receiver, or a transceiver, capable of operating in a broad range of operating frequencies governed by the IEEE 802.11 wireless standards.

The memory 302 can also include a data conversion module 318. The data conversion module 318 can include one or more instructions and/or executable program code configured to decompress a signal via at least one algorithm. The data conversion module 318 can further be configured to convert a received data stream to a mode in which it can be executed, viewed, or accessed by the user device 300. In some instances, the received data stream from any number of transmission modes may be compressed data.

Further referring to FIG. 3, the user device 300 can also include a location module 320, such as a GPS module and/or a built-in GPS processor. The location module 320 may include one or more instructions and/or executable program code to facilitate identifying a real time location for the user device 3100. In certain embodiments, the location module 320 may triangulate the position of the user device 300 by measuring the closest DBR tower or signal, or long-range wireless radio tower or signal.

In certain embodiments, the one or more communication connections 310 may also contain a broadcast receiver such as DBR receiver 317 to receive content items 124 via available digital radio frequencies. The processor 304 may also decode the data received on the DBR receiver 317. In one embodiment, the DBR receiver 317 may be configured with a fixed directional antenna. In another embodiment, the DBR receiver 317 may provide for in-band on-channel (IBOC) transmissions for designated radio frequency bands. IBOC transmissions may be configured with a multiplexer to carry several radio frequencies of variable bit rates. In another embodiment, the DBR receiver 317 may be configured with a single frequency network (SFN), thereby transmitting the same content to all suitable terrestrial transmitters. In another embodiment, the communication connections 310 may include any variety of medium over which network traffic is carried including, but not limited to, coaxial cable, twisted wire pair, optical fiber, hybrid fiber coaxial ("HFC"), microwave terrestrial transceivers, radio frequency communications, satellite communications, or combinations thereof.

In the embodiment shown in FIG. 3, the memory 302 can also include a data activation module 324. The data activation module 324 can include one or more instructions and/or executable program code configured to track one or more content items 124 to confirm whether the content items are authorized to be viewed or executed on the user device 300. If certain content items 124 currently requested by the user 102 are authorized, the web server 106 may transmit an authorization signal for the user device 300 to activate the content items 124 that have already been received via the DBR.

Figure 4:
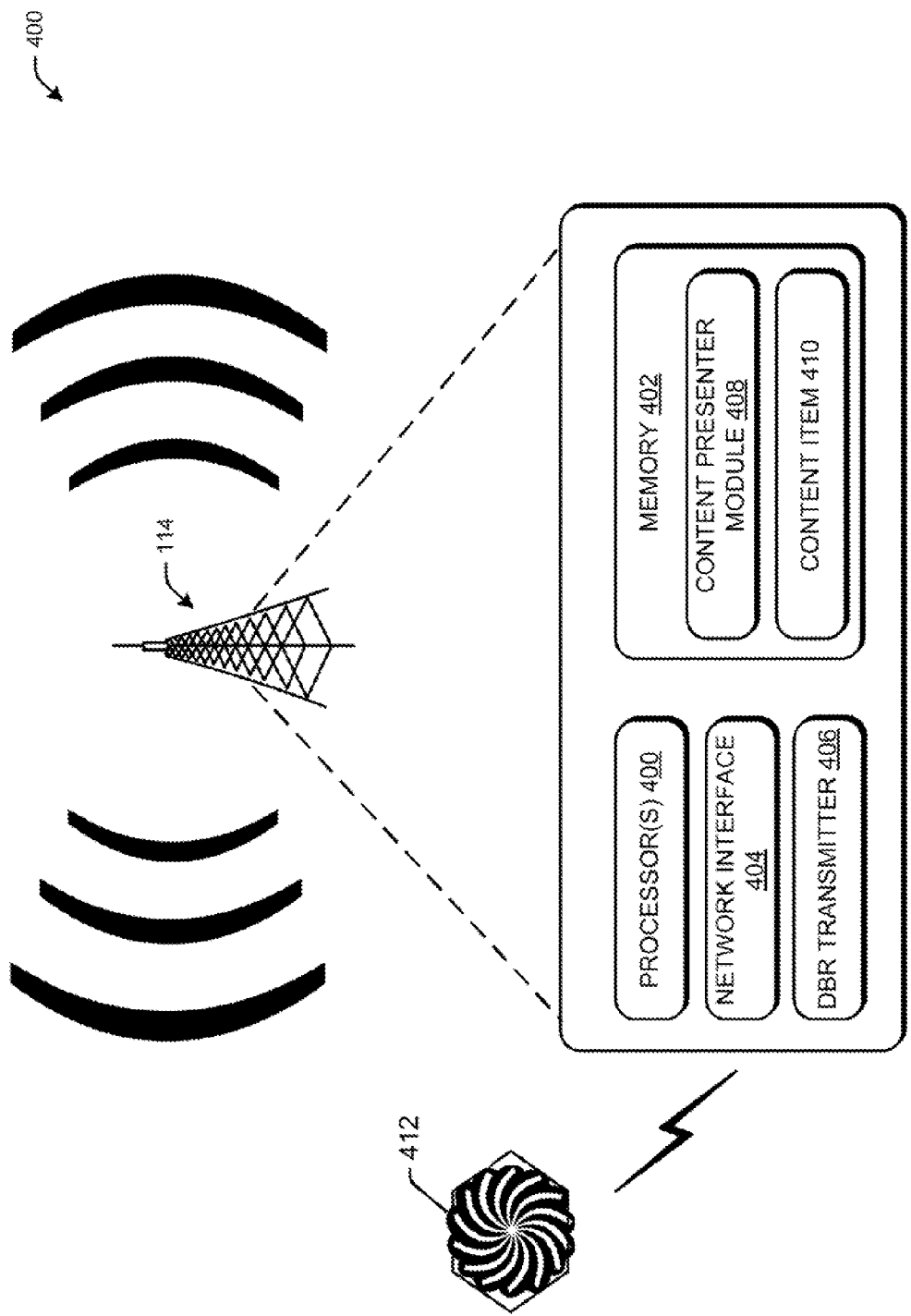
FIG. 4 is a schematic illustration of an example digital broadcast radio system configured for hybrid wireless content delivery in accordance with an embodiment of the disclosure.

FIG. 4 illustrates an example configuration 400 of a DBR system used for Internet hybrid wireless content delivery. The configuration 400 can include a DBR 114, which can include or otherwise be in communication with at least one processor 400, memory 402, and a DBR transmitter 406. The processor 400 can be configured to execute one or more instructions or computer-executable instructions stored in memory 402, such as a content presenter module 408 and any other module needed to facilitate functionality associated with the DBR transmitter 406. For example, the content presenter module 408 can include computer-executable instructions to decide when to include what content into the broadcast stream at any given time including, but not limited to, audio program, music, or most popular Internet content that is on the broadcast list for this geographic location, and transmit one or more content items within a broadcast stream. The memory 402 can be any type of storage medium and can store the content presenter module 408, other program or computer-executable instructions, and one or more content items 410. The network interface 404 can be operatively connected to the DBR tower 114 to receive, via a network, one or more content items 410 from a web server, such as 106, or cache server, such as 118. The DBR transmitter 406 can be operatively connected to the DBR tower 114 to transmit, via a network, one or more content items 410 to any number of user devices 104, web servers 106, databases 108, cache servers 118, and associated databases 120. In some embodiments, the transmitter DBR 406 can transmit one or more data streams through at least one preexisting frequency.

In some embodiments, the DBR transmitter 406 may utilize any suitable hardware and software to wirelessly broadcast messages using any suitable wireless broadcast media, such as Digital Broadcast Radio technologies (e.g., HD Radio, DAB, DAB+, DMB, DRMetc), or any digital TV broadcast technologies (e.g., ATSC, DVB-T, ISDB-T, DTMB, etc.)

In the embodiment shown in FIG. 4, the network interface 404 can receive a carousel data stream 412 from a web server, such as 106(A) in FIG. 1. The carousel data stream 412 can include one or more broadcast lists for the DBR system to periodically broadcast, such as throughout the day. The carousel data stream 412 may be in a compressed format, or otherwise formatted such that the content presenter module 408 may decode or suitably format the carousel data stream.

The content presenter module 408 may decode the received carousel data stream 412 if the data stream is in an encoded or unsuitable format. In some embodiments, the content presenter module 408 may add one or more parity bits or other information to the carousel data stream 412 for subsequent transmission to any number of user devices 104. The content presenter module 408 may store one or more received data streams for subsequent transmission at predetermined intervals.

FIGS. 5-9, 10A and 10B are example methods for a hybrid wireless content delivery system that can be implemented by the example system, configurations, and system components illustrated in FIGS. 1-4 according to embodiments of the invention. The methods described in FIGS. 5-9, 10A and 10B may be modified in various ways in accordance with certain embodiments. For example, one or more operations of the methods described in FIGS. 5-9, 10A and 10B may be eliminated or executed out of order in other embodiments. Additionally, other operations may be added to FIGS. 5-9, 10A and 10B in accordance with the other embodiments.

Figure 5:
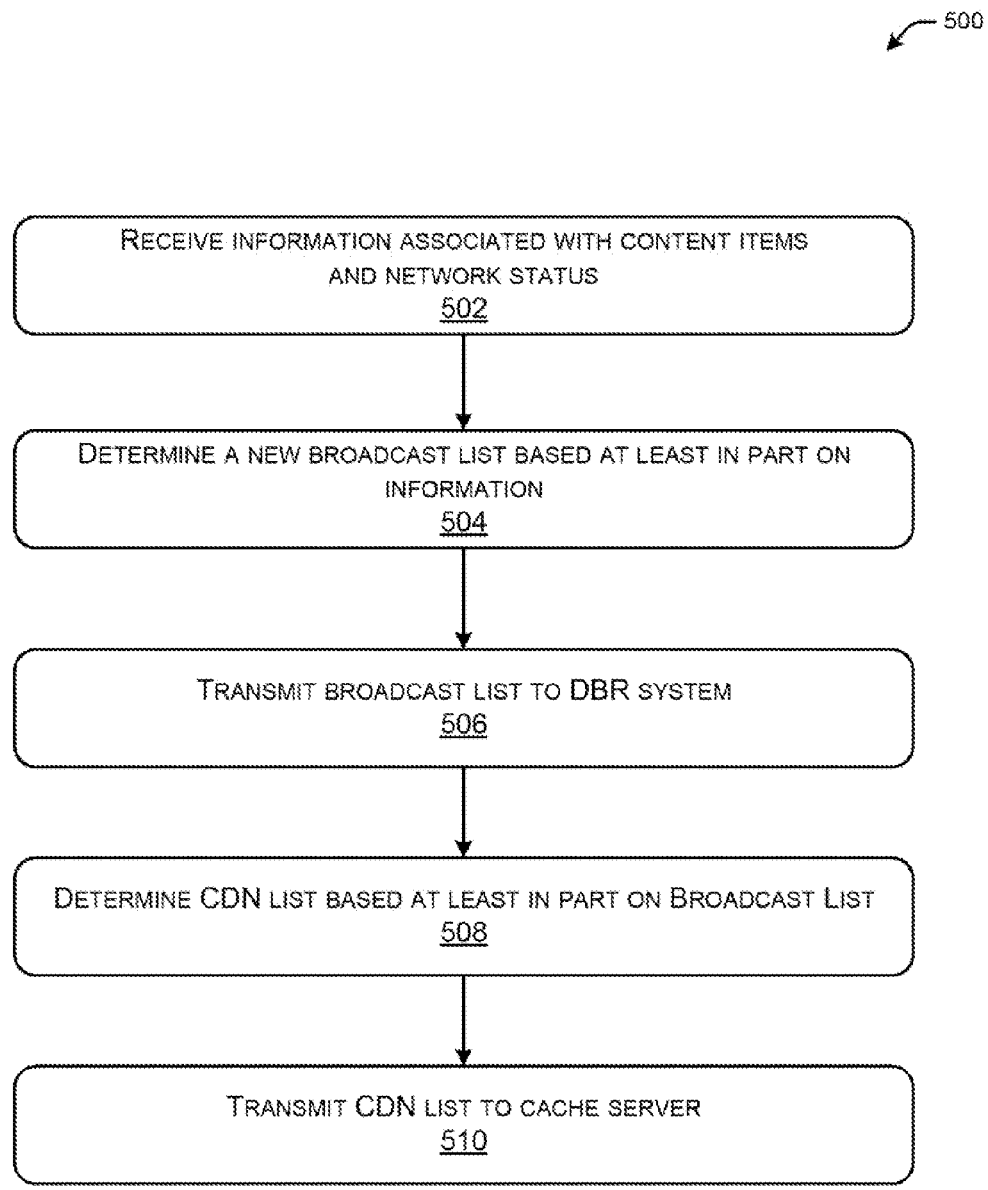
FIG. 5 is a flow for an example method for a hybrid wireless content delivery system in accordance with an embodiment of the disclosure.

FIG. 5 illustrates an example method 500 for content delivery by a web server system in accordance with an embodiment of the invention. The method 500 starts at operation block 502.

In operation block 502, information associated with one or more content items and at least one network status can be received. For example, the web server, such as 106(A) in FIG. 1, may receive one or more requests from user devices. The requests can be associated with one or more content items. The web server 106(A) may track the number of requests for the one or more content items. For instance, the network data may include request rates of one or more content items from cache servers, such as 118, or other web servers 106(N); the total number of requests for one or more content items; and the locations from which one or more requests for one or more content items originate. Other information associated with one or more content items can include, but is not limited to, the size of a content item, other measures of popularity of a content item (such as the number of "Likes" from a social media application or number of social media hits), and various statistics associated with different types of content items. For instance, for content items associated with music, statistics associated with different genres of music may be obtained. For content items associated with apps, statistics associated with one or more updates may be obtained.

Further, the web server 106(A) can receive, obtain, or otherwise access other network data, which can include at least one network status. Network data can include, but is not limited to, measures of available bandwidth, current or past loads on the network, measures of current or past network congestion, current or past download rates to user devices, and network status updates.

In operation block 504, a new broadcast list can be determined based at least in part on the information. For example, the web server 106(A) may determine a broadcast list based at least in part on information associated with one or more content items and any received network data. The information could include a total number of user requests for a specific content item that originates from a certain geographic area, such as 5,000 requests for a particular song by an artist popular in Atlanta, Ga. Consequently, the web server 106(A) may determine a broadcast list with the particular song by the artist popular in Atlanta, Ga. In one embodiment, the new broadcast list can be determined based on received network data, such as an indication that network usage is heaviest or most congested between 2:00 p.m. and 4:00 p.m on weekdays for Atlanta, Ga. This information may be used to determine whether to include certain content items, such as the song by a particular artist popular in Atlanta, Ga., in the new broadcast list. In this instance, the new broadcast list may be determined to include content items that are relatively small, such as audio clips of the particular song by the artist popular in Atlanta, Ga., if the content is to be transmitted between 2:00 p.m. and 4:00 p.m on weekdays in Atlanta, Ga.

In any instance, the contents on the new broadcast list can be transmitted or streamed to one or more user devices at a certain geographic location, such as user device 104 in FIG. 1, using a DBR system, such as the DBR tower 114. In certain embodiments, the content of a new broadcast list may be changed based at least in part on time of day, available bandwidth, available bandwidth for a particular DBR, one or more user selections of content items, user preferences for content items or similar content items, popularity of content items or similar content items, and measures of popularity for content items via any number of social media outlets. For example, a web server, such as 106(A), may receive user preferences for certain content items from various social media websites. If preferences about certain content items are posted on social media websites with relatively higher frequency, such as more "Likes" than "Dislikes," this information can be measured as well as the total number of feeds or social media postings related to certain content items 124, and the total number of feeds or social media postings involving reviews about certain content items.

In one embodiment, a web server, such as 106A, may search through one or more social media feeds by searching for a string of characters that could represent one or more content items. For example, the string could be the name of a song or the song artist.

In one embodiment, a web server, such as 106A, could obtain a count of the total number of feeds that refer to certain content items, and use the count as a metric to determine relative popularity of the content items.

In one embodiment, a web server, such as 106A, or other server device may receive data regarding a physical location of a user 102 accessing one or more content items. The user's location may be ascertained by Global Positioning System (GPS) information obtained from an associated user device, such as 104, or by triangulating the position of the associated user device 104 by using a long-range radio signal, such as 3G, or other signal received from the user device 104.

In any instance, some or all of the received information can be weighted using one or more algorithms representing some or all of the information as parameters in the algorithm, such as popularity, user location, social media popularity, etc. The one or more algorithms could determine a metric to rank certain content items for one or more broadcast lists, such as creating separate rankings of a particular content item for various locations. Thus, a song popular in Atlanta, Ga., might rank #1 on a broadcast list for Atlanta, but might rank relatively lower in other locations, such as Nashville, Tenn., and Los Angeles Calif.

In operation block 506, a broadcast list can be transmitted to a DBR system. For example, a web server, such as 106A, can transmit a broadcast list to a particular DBR, such as DBR tower 114. In one embodiment, the transmission may be sent by the DBR tower 114 wirelessly using a wireless radio signal 130 or a digital radio signal. The transmission can be received by the DBR tower 114, and the DBR tower 114 can obtain the broadcast list from the transmission. In some embodiments, the same or different broadcast lists can be sent to any number of DBR towers, such as 114. In any instance, the DBR tower 114 can utilize a broadcast list to offer or otherwise provide one or more content items to any number of user devices, such as 104, via the DBR tower 114, which can periodically transmit the content items to user devices 104 as needed or instructed.

In operation block 508, a list of content items can be determined based at least in part on a broadcast list. For example, a web server, such as 106A, may determine that certain content items on a particular broadcast list, or in some instances, not on a particular broadcast list, may be better suited to be distributed to one or more users via at least one edge network, such as from a cache server, such as 118, and/or associated database 120. For instance, if particular content items are relatively popular or may be downloaded relatively more frequently than other content, these content items may be better suited to be downloaded from a cache server 118, or from a location relatively closer to a requesting user device. We refer to such a list of content items to be delivered from a cache server as a CDN list. In any instance, the web server 106A can determine a CDN list, based at least in pan on one or more broadcast lists.

In operation block 510, a CDN list is transmitted to a cache server. For example, a web server, such as 106A, can transmit a CDN list to a cache server, such as 118. The CDN list can be utilized by the cache server 118 to offer or otherwise provide one or more content items to any number of user devices, such as 104, via the cache server 118, which can more quickly transmit the content items to user devices 104 as needed or instructed.

Thus, in certain embodiments, a set of content items may have respective popularity rankings for various locations. A predetermined number of highest ranked content items for each location may be encoded into a data stream for each location. An algorithm can determine that the most popular content items should be sent to a cache server, such as 118, because these content items will be retrieved more frequently than the other content items. A web server, such as 106A, can transmit certain popular content items to user devices, such as 104, from the web server 106A, while other more popular content items can be transmitted to user devices 104 from the cache server 118. In this manner, some of the most popular content items can be transmitted relatively quickly to the user devices via the cache server 118, which allows users 102 located at certain locations to retrieve content items quicker than if all of the users 102 had to retrieve the requested content items from the web server 106A.

Figure 6A:
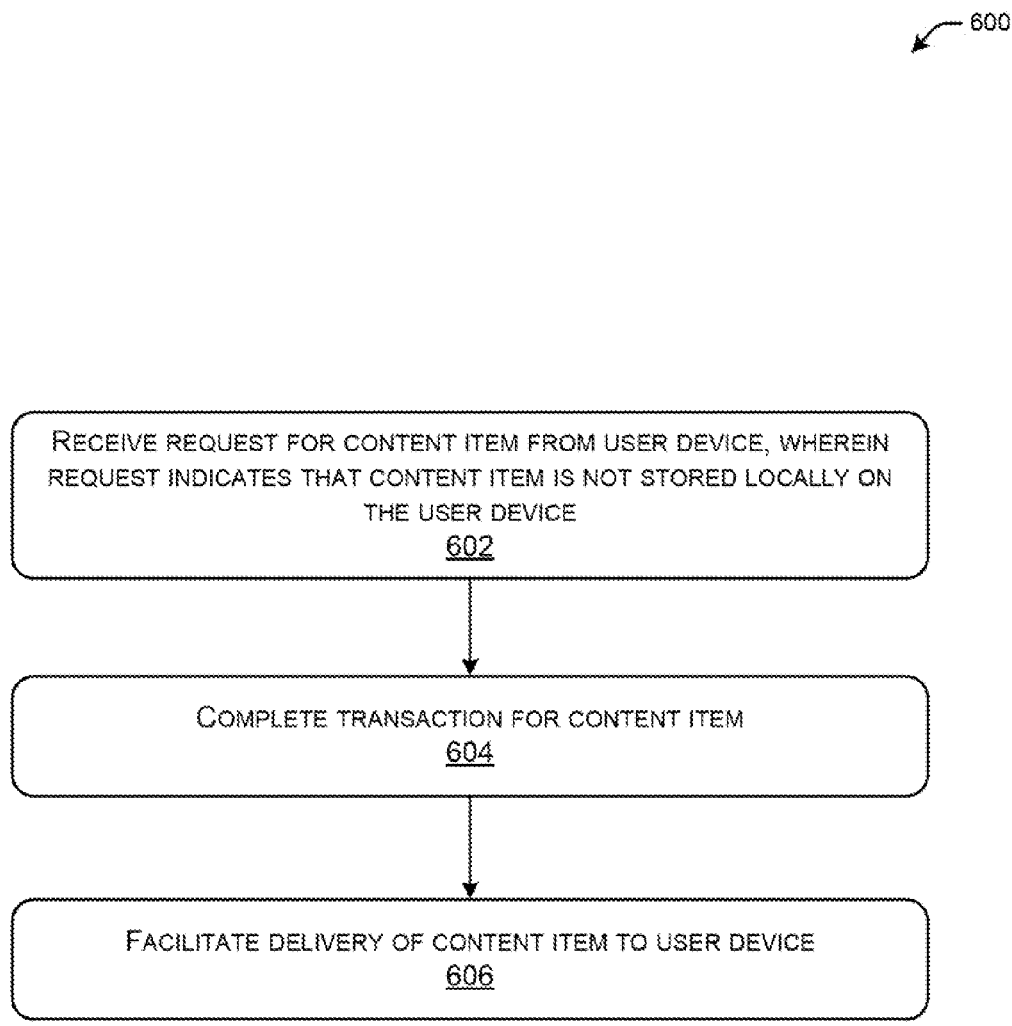
FIGS. 6A and 6B are flow for example methods for handling associated transactions for a hybrid wireless content delivery system in accordance with an embodiment of the disclosure.
Figure 6B:
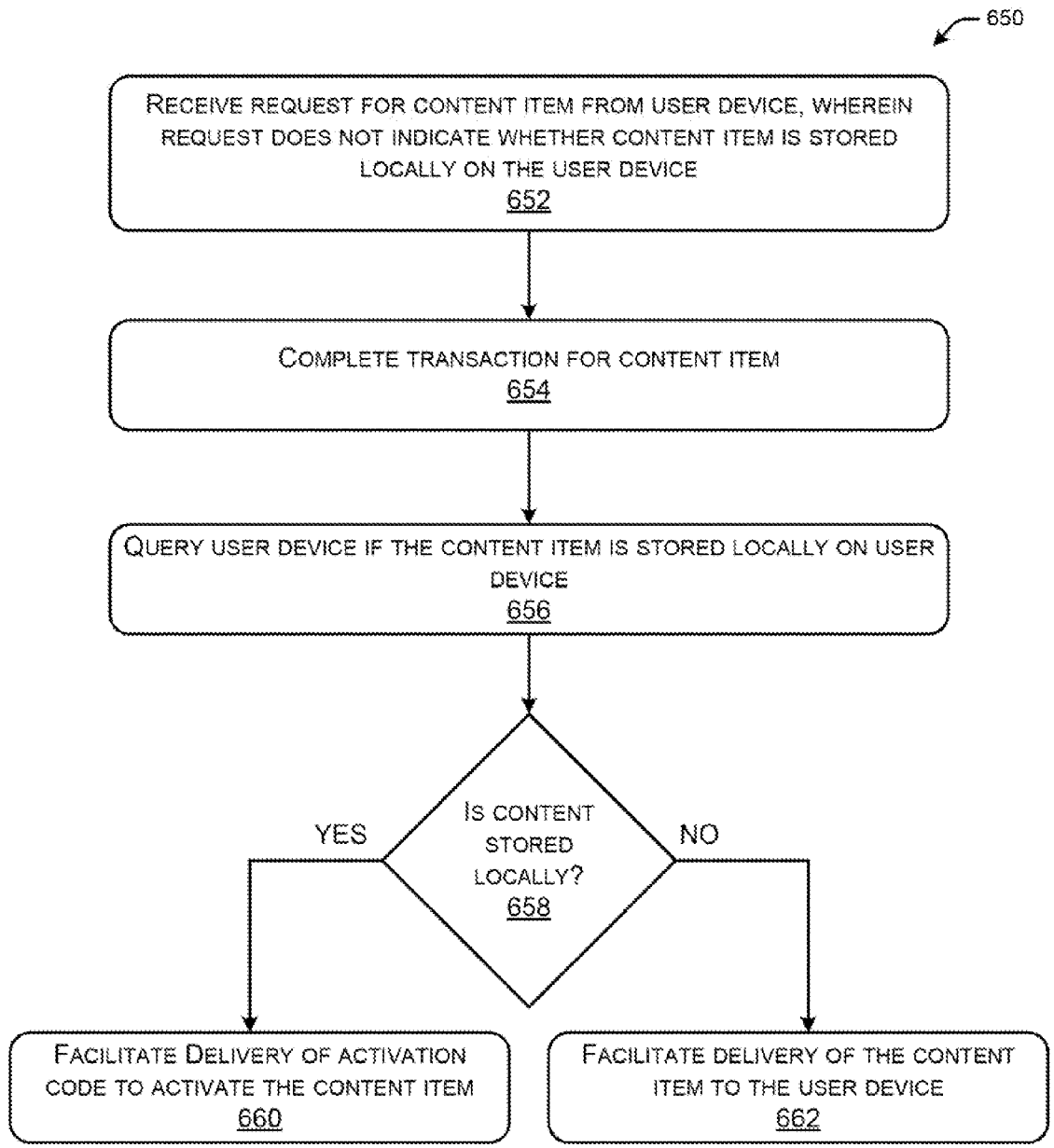

FIGS. 6A and 6B illustrate example methods for a web server handling content delivery transactions to a user in accordance with an embodiment of the disclosure.

Referring to FIG. 6A, the method 600 begins at operation block 602, in which a request is received from a user device for a content item, wherein the request indicates that the content item is not stored locally on the user device. For example, a web server, such as 106A, may receive a request from a user device, such as 104, for a particular content item. The request may include the purchase, lease, free giveaway, sampling, or updating of at least one content item. In certain instances, the requested content item may not be a popular content item, and thus may not appear on a popular-type list, such as a broadcast list or CDN list, as described above. In these instances, the requested content item may be determined or otherwise assumed to not be stored locally on the requesting user device 104. Most web browsers already have cache mechanisms to store a local copy of a piece of content that is recently requested by the user. This mechanism can be reused here to store a local copy of contents received by broadcast media such as DBR receivers on the local device. Even though the user is not aware that this content is already stored locally, the browser can be enhanced to check the user request against the local storage to determine if the content has already been stored locally on the requesting user device 104.

In operation block 604, a transaction for the content item can be completed. For example, a transaction for a requested content item may be completed by a web server, such as 106A, prompting a user, such as 102, to provide payment information or otherwise receive payment information from a user device, such as 104. Thus, if the user device 104 transmits a request for "GAME," the web server 106A may determine if "GAME" has an associated cost, and if so, the web server 106A, may either prompt the user 102 via the user device 104 for payment information, or may otherwise obtain previously stored payment information associated with the user 102 from the user device 104, from a database, such as 108A, or from a third-party payment entity, such as a bank or financial institution.

In operation block 606, delivery of the content item to the user device can be facilitated. For example, a web server, such as 106A, can facilitate delivery of the requested content item via a transmission to the requesting user device, such as 104, or to any other desired user device. In this example, the web server 106A can transmit the requested content item from a data storage device, such as database 108, to the user device 104, or in some instances, can direct a cache server 118 to transmit the requested content item from a data storage device, such as database 120, to the user device 104. In any instance, the requested content item can be downloaded to the user device 104 for the user's consumption.

In one embodiment, a web server, such as 106A, may facilitate delivery by transmitting an authorization or authorization code for the user device 104 to activate a content item that has been delivered or transmitted to the user device 104. In another embodiment, the web server 106 may transmit the content item 124 to the user device 104.

Turning to FIG. 6B, the method 650 begins at operation block 652. In operation block 652, a request is received from a user device for a content item, wherein the request does not indicate whether the content is stored locally on the user device. For example, a web server, such as 106A, may receive a request from a user device, such as 104, for a particular content item. The request may include the purchase, lease, free giveaway, sampling, or updating of at least one content item. In certain instances, the requested content item may be a popular content item, and thus may appear on a popular-type list, such as a broadcast list or CDN list, as described above. In these instances, the requested content item may be determined or otherwise be assumed to be previously stored locally on the requesting user device 104. In some instances, the local user device 104 may check against its local cache list to confirm that the requested content item is on the list, and may exchange information with the web server subsequently to confirm that the local copy is the most recent version. Hence it is not necessary to obtain another copy from the web server, so consumption of expensive network bandwidth is avoided.

In operation block 654, a transaction for the content item can be completed. For example, a transaction for a requested content item may be completed by a web server, such as 106A, prompting a user, such as 102, to provide payment information or otherwise receive payment information from a user device, such as 104. Thus, if the user device 104 transmits a request for "GAME," the web server 106A may determine if "GAME" has an associated cost, and if so, the web server 106A may either prompt the user 102 via the user device 104 for payment information, or may otherwise obtain previously stored payment information associated with the user 102 from the user device 104, from a database, such as 108A, or from a third-party payment entity, such as a bank or financial institution.

In operation block 656, the user device can be queried to determine whether the content is stored locally or the user device. For example, a web server, such as 106A, can query a user device, such as 104, to determine whether a particular content item is stored locally on the user device 104 and if such a local copy is still fresh (i.e., it is not an outdated copy). In some embodiments, locally stored content items may be stored in a particular portion of a data storage device associated with the user device 104. In other embodiments, locally stored content items may be identified by a local list stored by the user device 104, or by at least one server device that manages access to some or all of the content stored on the user device 104. In some embodiments, the files stored in the memory of the user device 104, or in a local list stored by the user device 104 or server device, may be searched to identify a content item that corresponds to a particular requested term, such as a song.

In operation decision block 658, a determination is made whether the content item is stored locally. For example, the local web browser on the user device can check against its local cache list to determine if the item is stored locally already. If the content item is determined to be stored locally, the YES branch is followed to operation block 660.

In operation block 660, delivery of an activation code is facilitated to activate the content item. For example, a web server, such as 106A, may transmit an authorization or authorization code for the user device 104 to activate a content item that is stored locally on the user device 104. The user device 104 can utilize the authorization or authorization code to unlock or otherwise enable the content item to be played, executed, or otherwise used by the user device 104.

Returning back to operation decision block 658, if the content item is determined to not be stored locally, the NO branch is followed to operation block 662 in which delivery of the content item to the user device can be facilitated. For example, a web server, such as 106A, can facilitate delivery of the requested content item via a transmission to the requesting user device, such as 104, or to any other desired user device. In this example, the web server 106A can transmit the requested content item from a data storage device, such as database 108, to the user device 104, or in some instances, can direct a cache server 118 to transmit the requested content item from a data storage device, such as database 120, to the user device 104. In any instance, the requested content item can be downloaded to the user device 104 for the user's consumption. Thus, in certain embodiments, a web server, such as 106A, may transmit a query to a user device, such as 104, to determine if certain content is locally stored on the user device. In some instances, the user device 104 may be configured to periodically retrieve data streams from a DBR tower 114. When the user device 104 receives certain content items from a DBR tower 114, the user device 104 may store the items locally in the memory of the user device 104. The received and/or stored content items may remain hidden from the user 102 until the content items are activated by the web server 106A.

Figure 7:
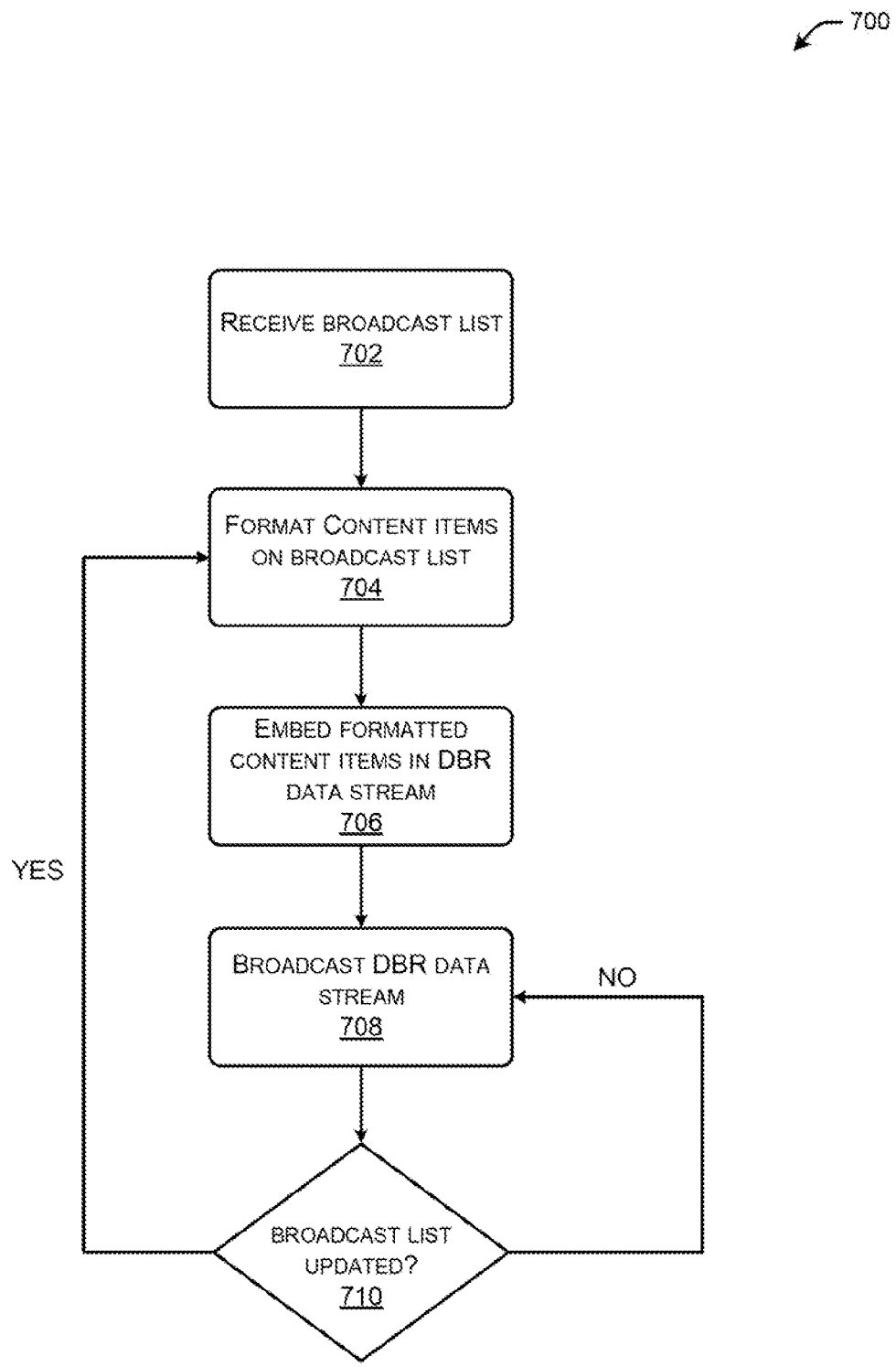
FIG. 7 is a flow for an example method for a hybrid wireless content delivery system in accordance with an embodiment of the disclosure.

FIG. 7 illustrates an example method for a DBR system handling content delivery in accordance with an embodiment of the disclosure. The method 700 begins at operation block 702, in which a broadcast list is received. For example, a DBR, such as 114, can receive a broadcast list from a web server, such as 106A, or other server device. In some instances, the broadcast list can include any number of content items, such as the 10 most popular songs listened to in a particular location.

In operation block 704, content items on the broadcast list are formatted. For example, the DBR 114 can process each of the content items on a broadcast list to suitably format the content items to be transmitted via an associated transmitter, such as 406. For instance, the DBR 114 can be configured to format some or all of the content items for transmission via a digital radio broadcast signal, such as the FM frequency, at a predetermined data rate per frequency. The DBR 114 may utilize any available but unused bandwidth by compressing the digital radio broadcast signal to be used to transmit the formatted content items. One example compression algorithm is Perpetual Audio Coding (PAC). Another example compression algorithm is high-definition coding. Many other suitable compression algorithms may be used by the DBR 114 to format the content items.

In operation block 706, formatted content items are embedded in a DBR data stream. For example, once the content items have been compressed, the compressed content items are embedded into a data stream by the DBR 114 such that the data can be transmitted using the FM carrier signal; that is, the data stream is embedded with the FM carrier signal. In some embodiments, any number of DBR 114 may occupy respective carrier air signals that are adjacent to each other, when transmitting using respective FM carrier signals. Depending on the total number of carrier signals, each DBR 114 may be able to embed data streams of various complexity and volume. A web server, such as 106A, may account for the total number of carrier signals when determining which content items should be sent to a particular DBR for transmission.

In operation block 708, the DBR data stream can be broadcast. For example, the DBR 114 may broadcast the data stream with the carrier signal, wherein the formatted content items on the broadcast list are embedded in the broadcast data stream. In one embodiment, the DBR 114 can transmit the same data stream continuously. In one embodiment, the DBR 114 may transmit the data stream at particular intervals depending on the time of day, available bandwidth, or user preferences. For example, a DBR 114 may cease transmitting FM radio carrier signals between the hours of midnight and 5:00 a.m. In certain instances, a DBR 114 may utilize relative silence on certain frequencies to transmit relatively larger data streams or more data streams In operation decision block 710, a determination is made whether a broadcast list is updated. For example, the DBR 114 can determine whether a current broadcast list has been updated. The DBR 114 may process a recently received broadcast list to compare the broadcast list with a prior received broadcast list. If the broadcast list has been updated, the YES branch is followed to operation block 704, in which one or more content items on the newly received broadcast list are formatted, and the method 700 can continue.

In some embodiments, at operation decision block 710, the DBR 114 can make a determination to update a broadcast list based at least in part on mixing broadcast lists from one or more web servers, such as 106A and 106N. For example, a broadcast list received from a particular web server, 106A, may be received by a DBR 114, and the DBR 114 may determine that the received broadcast list is not suitable for any number of reasons. The DBR 114 can obtain or otherwise receive any number of broadcast lists from one or more other web servers, such as 106N, or, in some instances, from other DBRs in other locations. In any instance, the web server 106A can use one or more broadcast lists from the other web servers 106N or DBR, and replace the received broadcast list from the web server 106A.

Returning to operation decision block 710, if the broadcast list has not been updated, the NO branch is followed to operation block 708, in which the data stream is broadcast by the DBR 114, and the method 700 can continue.

Figure 8:
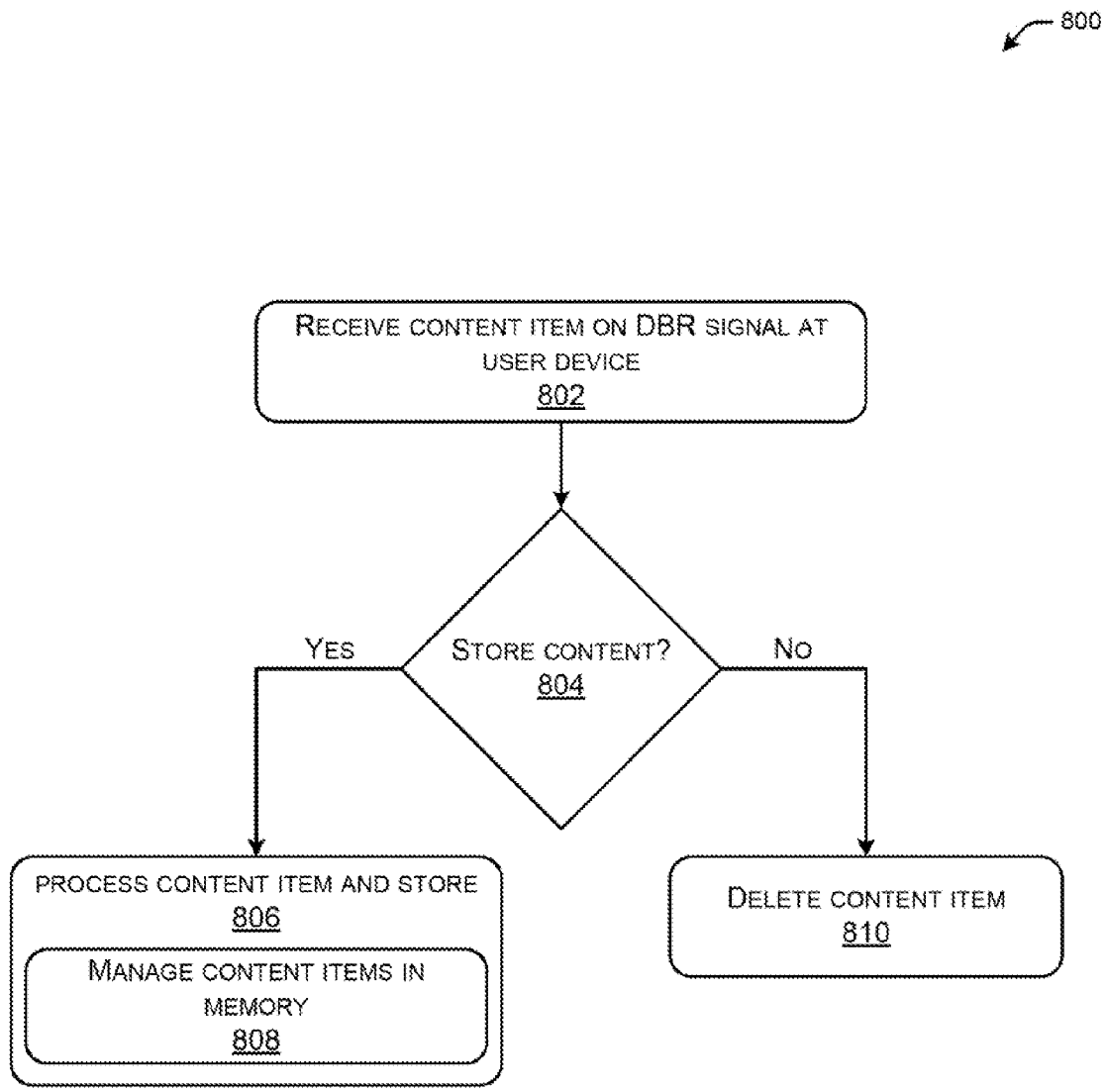
FIG. 8 is a flow for an example method for a hybrid wireless content delivery system in accordance with an embodiment of the disclosure.

FIG. 8 illustrates an example method 800 for managing content delivery receipt at a user device according to an embodiment of the invention. The method begins at operation block 802, in which one or more content items are received on a DBR signal at a user device. For example, one or more content items can be received via a DBR signal at a user device. In some embodiments, a user, such as 102, with an associated user device, such as 104, can receive at least one data stream including one or more content items from digital broadcast radio. In one embodiment, a user device 104 may have a list of content items that the user 102 would like to have on the user device 104. In this example, the user device 104 can receive one or more of the content items from the digital broadcast radio, and then scan for the one or more content items in the list, which may be stored as a user preference. The user device 104 may then delete all of the content items 122 that are not in line with the user's set preferences. In another embodiment, the user device 104 can download all content items 124 from the digital radio broadcast and then keep the content items 124 deactivated until the user requests the content items 124.

In operation decision block 804, a determination can be made whether to store the received content items. For example, the user device 104 can receive one or more content items via the digital broadcast radio, and the user device 104 can determine based on any number of factors whether to store the content items on the user device 104. The factors can include, but are not limited to, user selections, default settings, user preferences, and/or available storage space.

If a decision is made to store the content items, the YES branch can be followed to operation block 806, in which the content items are processed and stored. For example, if the user 102 has indicated a preference for rap music, the user device 104 may automatically store all rap songs in an associated memory and list titled "rap songs." One or more content items can be compressed, or, in some instances, decompressed, from the received format, and then stored in memory in a suitable format.

In operation block 808, content items can be managed in memory. For example, one or more content items can be cleaned out of memory and replaced with more recently received content items, if the older content items include one or more time stamps indicating expiration of the content or other conflict. If a decision is made not to store the content items, operation block 810, in which the content items are deleted. For example, if the user 102 has indicated a preference for, rap, but none of the downloaded songs are rap, then all of the downloaded songs can be deleted.

Thus, in one embodiment, the user device can examine one or more of the received content items from the digital radio broadcast radio to see if they match the user's preference list selected by the user on the user device 104 to indicate what categories of contents may be locally cached from the broadcast media. If one or more of the received content items are in the list as user preferences, then the content items in the list can be stored on the user device and processed as needed. If, however, one or more of the content items are not on the list, then the content items 124 not on the list can be deleted. Note that in some embodiments the list of preference may be implemented very narrowly (for example, only songs by a certain artist may be stored locally), while in other embodiments the preference may be interpreted more broadly such as only songs of a certain genre.

In one embodiment, the user device 104 can download all content items from the digital broadcast radio and then keep the content items 124 deactivated until the user requests the content items.

Figure 9:
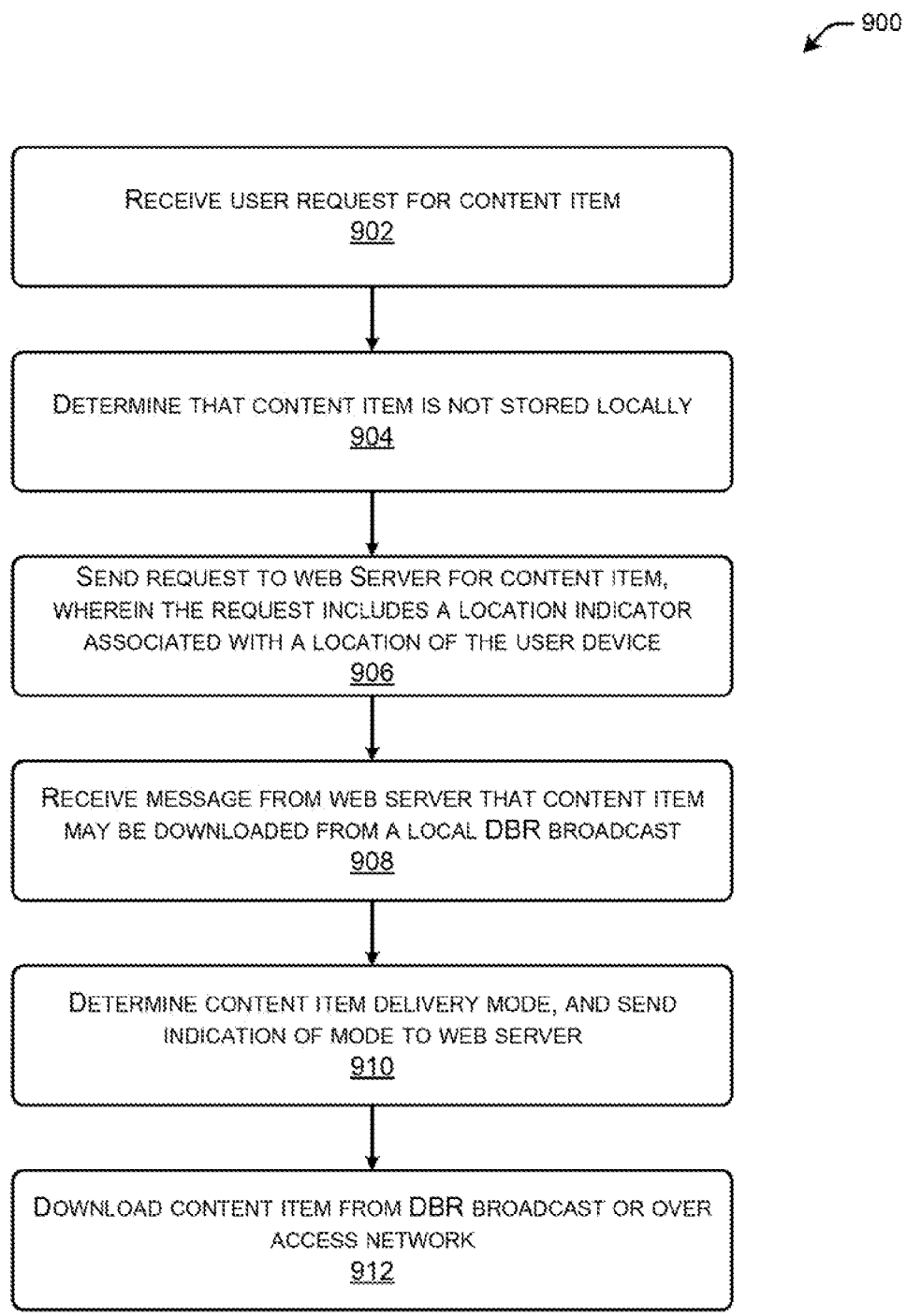
FIG. 9 is a flow for an example method for a hybrid wireless content delivery system in accordance with an embodiment of the disclosure.

FIG. 9 illustrates an example method 900 for a user device to manage receipt of content according to an embodiment of the invention. In operation block 902, the user device 104 may receive a request from the user. In certain embodiments, the user device 104 may have an application designed to retrieve requested content items. In other embodiments, the user device 104 may transmit a short-form message (SMS) to the web server.

In operation block 904, the user device 104 can determine if the content item is stored locally. The user device 104 may query its storage to determine if the requested content item is already located in the storage. In the event that the requested content item is already stored on the user device 104, the user device 104 may activate the requested content item for use without any delay associated with the content item.

In operation block 906, a request may be sent to the web server 106 for a content item 124, wherein the request can include a location indicator associated with a location of the user device 104. For example, the user device 104 may send a transmission indicating that the requested content item 124 is not stored on the user device 104. The user device may also transmit its physical location or an indication thereof. The physical location may be ascertained by the location module that may be embedded in the user device. The location module may include a GPS receiver. Alternatively, in certain embodiments, a location module may triangulate the position of the user device 104 based on the long-range radio 114 tower to which it is connected. In response to the request from the user device 104, the web server 106 may determine a transmission mode based in part on the physical location transmitted by the user device.

In operation block 908, the user device 104 may receive a message from the web server 106 indicating a particular transmission mode, such as a digital radio broadcast radio. For example, the user device 104 may receive a notification from the web server 106 indicating the content item 124 may be available via the DBR 114 at a certain period in time. In another example, the user device 104 may receive an indication that the content item is available from a cache server 118 for immediate downloading. In operation block 910, a content item delivery mode can be determined, and an indication of the mode can be sent to the web server 106. The web server 106 may determine the content delivery mode based at least in part on the location indicator for the user device 104 and/or the requested content item 124 or a combination thereof. The web server 106 may query its database to identify information associated with the requested content item 124. For example, the web server 106 may also contain various broadcast lists for many DBR systems. The web server 106 may then determine if the content item 124 is on a broadcast list for transmission via DBR 114 based at least in part on the physical location of the user 102. Other considerations may include network congestion, time of day, user preferences, content items priority, content item popularity, etc. The web server 106 many transmit a message to the user device 104 indicating the mode of transmission for the requested content item 124.

In operation block 912, the content item can be downloaded from, for example, a DBR broadcast or over the access network to the user device. That is, in an embodiment, the user device 104 may download the requested content item 124 from a DBR broadcast. Alternatively, the user device 104 may download the requested content item 124 from the access network (e.g. a long-range radio such as a cellular tower 110, LAN, WLAN, WI-FI, WIMAX or other such mediums). In one example, the user device 104 may receive preferences from the user to connect to the available DBR 114 broadcast to retrieve the requested items. In other embodiments, the user device 104 may first try to retrieve the content items from the DBR 114, however, if there is an undesirable delay associated with downloading the content item 124 from the DBR 114 broadcast list, the user device 104 may retrieve the content item from the access network.

Figure 10A:
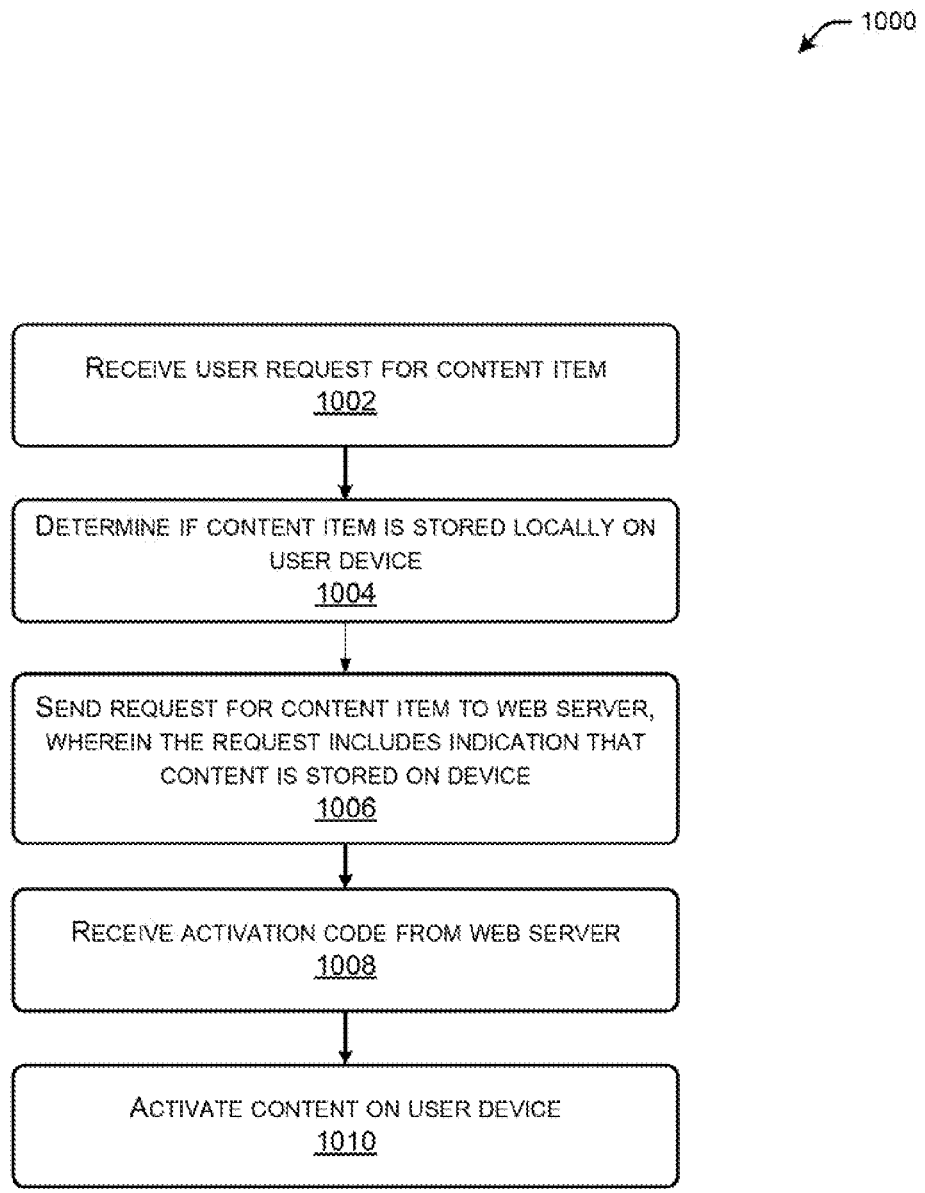
FIGS. 10A and 10B are flow for an example method for a hybrid wireless content delivery system in accordance with an embodiment of the disclosure.

FIG. 10A illustrates an example method 1000 for a user device to manage receipt of content according to an embodiment of the invention. In operation block 1002, the user device may receive a user request for a content item. In certain embodiments, the user device 104 may have an application designed to retrieve requests for content items. In other embodiments, the user device 104 may transmit a short-form message (SMS) to the web server.

In operation block 1004, a determination is made whether a content item 124 is stored locally on a user device 104. The user device 104 may query its data storage 308 and/or memory to determine if the requested content item 124 is already located locally. If the user device 104 does not identify the content item 124 in storage 308, then the user device 104 may transmit a message indicating that the content item 124 is not local and process the user request for the content item according to the embodiments of example method 900.

In operation block 1006, a request for a content item may be sent to a web server, wherein the request may include an indication that content is stored on the device. In the event that the requested content item 124 is already located on the user device 104, the user device 104 may request that the web server 106 activate the requested content item 124 or facilitate the activation of the content item. The user device 104 may transmit a transmission indicating that the requested content item 124 is already located on the user device 104.

In operation block 1008, an activation code may be received from the web server 106. The web server 106 may transmit an activation code to the user device. In one example, the web server 106 may generate and transmit a token or an activation code that may allow the user device 104 to activate the content item 124.

Figure 10B:
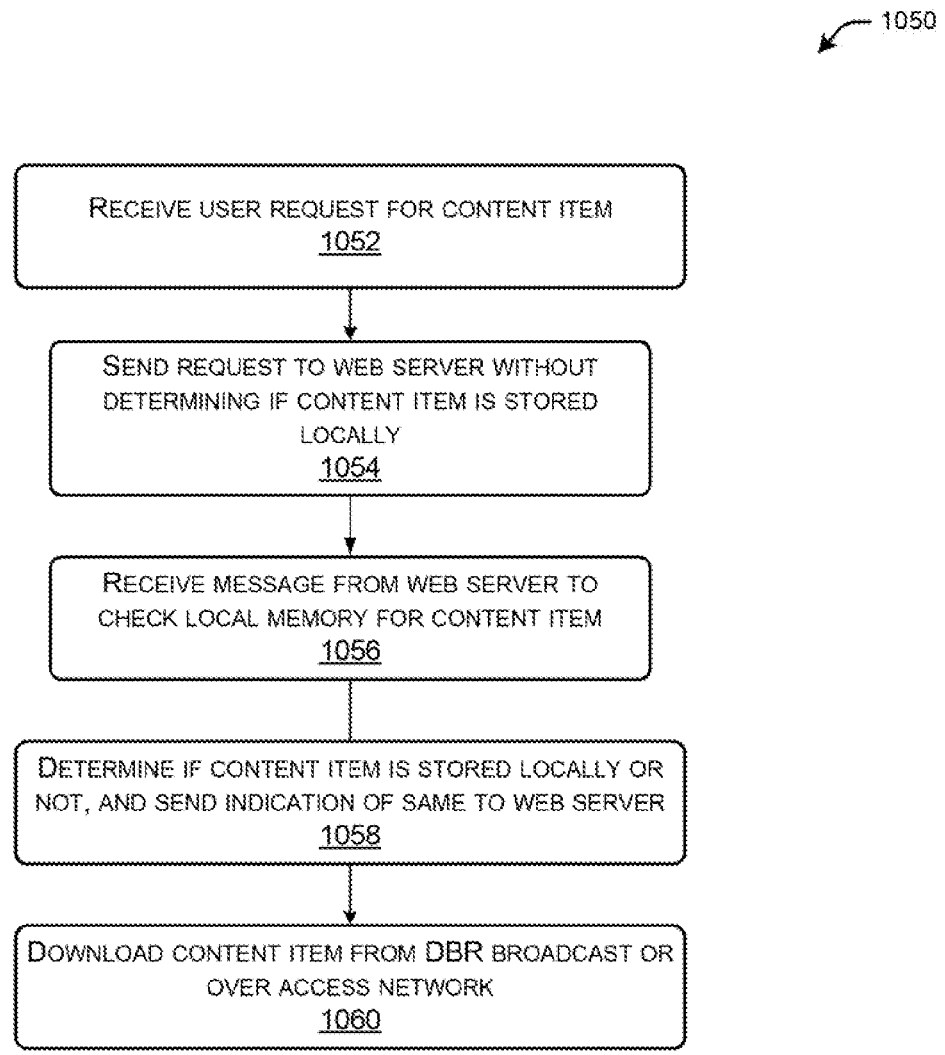

In operation block 1010, content is activated on a user device. The content item 124 is activated on the user device 104, when the user device 104 receives the activation code. In one example, the user device 104 may have the content item 124 hidden from the user. In certain embodiments, the user device 104 may display the content item 124 on a menu. In other embodiments, the user 102 may access the content item 124 from a menu. FIG. 10B illustrates an example method 1050 for a user device to manage receipt of content items. In the operation block 1052, a user request is received for a content items. The user device 104 may receive a request from the user. In certain embodiments, the user device 104 may have an application designed to retrieve requests for content items 124. In other embodiments, the user device 104 may transmit a short-form message (SMS) to the web server 106.

In operation block 1054, a request is sent to a web server without determining if the content item is stored locally. The user device 104 may send a transmission indicating that the requested content item 124 be downloaded from the web server 106. The user device 104 may also indicate its physical location to the web server 106.

In operation block 1056, a message is received from the web server to check local memory for the content item. For example, the web server 106 may determine if the content item 124 may have been already transmitted to the user device by comparing DBR broadcast lists near the physical location of the user device. For example, if the user device is in "Atlanta, Ga.," the web server may access its database to retrieve the DBR broadcast lists that were recently transmitted to DBRs 114 in the Atlanta area. If the content item 124 is in one of the broadcast lists, the web server 106 may transmit a message to the user device 104 indicating that the user device 104 check locally for the content item 124. If not, then the web server 106 may facilitate the download of the content item 124 to the user device 104 via an access network such as in accordance with the aspects of the method 900.

In operation block 1058, a determination is made whether the content item is stored locally or not, and an indication of the same is sent to the web server. The user device 104 may query its storage 308 to determine if the requested content item 124 is already located in the storage 308. If the user device 104 locates the content item 124, it may transmit a transmission to the web server 106 indicating that the requested content item 124 is already on the user device 104. If the user device 104 is unable to locate the content item 124, it may transmit a transmission to the web server 106 indicating that the content item 124 is not located on the user device 104. In some embodiments, the user device 104 may have received a broadcast list from the DBR 114, where the broadcast lists contain certain content items. The user device 104 may set preferences to receive certain broadcast lists. Depending on user preferences or default preferences, or both, the user device 104 may purge the memory 302 of certain content items.

In operation block 1060, when the content item 124 is not stored locally, the content item may be downloaded from a DBR broadcast or over an access network. If in operation block 1058, the web server receives an indication that the content item is not stored locally, the web server may transmit a transmission mode for the user device. The user device may use an access network, or alternatively, wait for the next available DBR broadcast to retrieve the content item 124. The web server 106(A)-106(N) may query its database 108(A)-108(N) to identify the requested content item 124. The database may also contain data regarding various broadcast lists for many DBR systems. The web server 106 may determine if the content item 124 on a broadcast list for transmission via DBR 114 is the physical location of the user. Alternatively, the web server 106 may determine that the requested content item 124 is available for download via a 114, WI-FI, WIMAX, LAN or other such mediums. The web server 106 many transmit a message to the user device 104 indicating the mode of transmission for the requested content item 124.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to any type of disk including floppy disks, optical disks, compact disk read-only memories ("CD-ROMs"), compact disk rewritables ("CD-RWs"), magneto-optical disks, semiconductor devices such as read-only memories ("ROMs"), random access memories ("RAMs") such as dynamic and static RAMs, erasable programmable read-only memories ("EPROMs"), electrically erasable programmable read-only memories ("EEPROMs"), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method comprising:
    receiving, by a server having at least one processor, a request from a mobile device, wherein the request indicates one or more content items;
    determining, by the server, a location of the mobile device;
    determining, by the server, whether the one or more content items are stored on the mobile device;
    if the indicated one or more content items are not located on the mobile device, then determining, by the server, a transmission medium for delivery of the indicated one or more content items to the mobile device, wherein the determining is between at least an access network and a digital broadcast radio system, and based at least in part on the indicated one or more content items, the location of the mobile device and an available bandwidth of the access network; and sending, by the server, an indication of the transmission medium to the mobile device; and
    if the indicated one or more content items are located on the mobile device, then transmitting, by the server, a signal for activating the one or more content items on the mobile device.

2. The method of claim 1 further comprising:
    determining values representing at least in part one or more preferences for the indicated one or more content items; and
    identifying the transmission medium based on the determined values.

3. The method of claim 2, wherein receiving, from the mobile device, one or more preferences further includes receiving a predicted battery usage for the mobile device.

4. The method of claim 2, wherein receiving, from the mobile device, one or more preferences further includes a current connectivity state by the mobile device for the transmission medium.

5. The method of claim 1 further comprising transmitting a configuration identifying a frequency associated with at least one digital radio tower, to the mobile device.

6. The method of claim 5 further comprising a predefined time interval associated with the configuration, wherein the predetermined time intervals indicates a time in which the one or more content items is broadcasted.

7. The method of claim 1 further comprising transmitting a configuration identifying a long-rage radio tower frequency, based at least in part on the location of the mobile device.

8. The method of claim 1 further comprising transmitting a configuration to identify a cache server associated with the indicated one or more content items.

9. The method of claim 1 further comprising:
    determining if the mobile device is authorized to consume the indicated one or more content items; and
    selecting an activation mode for the indicated one or more content items if the mobile device is authorized to consume the indicated one or more content items.

10. A mobile device comprising:
    at least one processor;

a memory comprising computer executable instructions, when executed by the least one processor, enables the at least one processor to implement a method comprising:

transmit one or more signals associated with a request, wherein the request identifies one or more content items, and includes location information for the mobile device and an indication of whether the one or more content items are stored on the mobile device;

if the indicated one or more content items are not located on the mobile device, then receiving a first signal indicating a transmission medium over which the one or more content items may be received, the first signal indicating a selection between at least an access network and a digital broadcast radio system as the transmission medium, and said selection based at least in part on the indicated one or more content items, the location of the mobile device and an available bandwidth of the access network; and if the indicated one or more content items are located on the mobile device, transmitting a second signal for activating the one or more content items.

11. The device of claim 10, wherein the digital broadcast radio system includes at least one digital radio tower.

12. The device of claim 10 wherein the at least one processor is further configured to connect to at least one long-range wireless radio tower.

13. The device of claim 10 wherein the at least one processor is further configured to connect to at least one wireless access point.

14. The device of claim 10, wherein the processor is further configured to connect to the digital broadcast radio system, to receive the indicated content item based on a predefined time interval.

15. A non-transitory computer-readable medium having stored thereon instructions, that when executed by a machine, cause the computer processor to:

receive, by a server having at least one processor, a request from a mobile device, wherein the request indicates one or more content items;

determine, by the server, a location of the mobile device;

determine if the indicated one or more content items are located on the mobile device;

if the indicated one or more content items are not located on the mobile device, then transmitting a first signal to the mobile device indicating a transmission medium over which the one or more content items may be received, the first signal indicating a selection between at least an access network and a digital broadcast radio system as the transmission medium, and said selection based at least in part on the indicated one or more content items, the location of the mobile device and an available bandwidth of the access network; and if the indicated one or more content items are located on the mobile device, transmitting a second signal for activating the one or more content items.

16. The computer-readable medium of claim 15 having stored thereon instructions, that when executed by the machine, cause the machine to:

determine values for the one or more content items wherein the values are indicative of a user-selected preference and a physical location for a user; and select the transmission medium based on the values.

17. The computer-readable medium of claim 15 having stored thereon instructions, such that, when executed by the machine, cause the machine to receive, from a user, a plurality of preferences.

18. A method for transmitting data comprising:

receiving, by a digital broadcast radio system comprising at least one processor, one or more content items, wherein the digital broadcast radio system is associated with a predefined service area, and wherein the one or more content items are based, at least in part, on popularity of the one or more content items within the predefined service area;

determining, by the digital broadcast radio system, whether the one or more content items are stored on a user device in response to a request for the one or more content items;

if the indicated one or more content items are not located on the user device, then determining, by the digital broadcast radio system, a transmission medium for delivery of the indicated one or more content items to the mobile device, wherein the determining is between at least an access network and the digital broadcast radio system, and based at least in part on the indicated one or more content items, the location of the mobile device and an available bandwidth of the access network; and sending, by the digital broadcast radio system, an indication of the transmission medium to the mobile device; and if the indicated one or more content items are located on the user device, then transmitting, by the digital broadcast radio system, a signal for activating the one or more content items on the user device.

19. The method of claim 18 wherein the transmission is further based at least in part on a location of the digital broadcast radio system.

20. The method of claim 18 wherein receiving, by the digital broadcast radio system further includes:

establishing a connection to a server, by the digital broadcast radio system, at regular intervals to retrieve a new data stream.

21. A method for transmitting data comprising:

receiving, by a server having at least one processor, a plurality of requests by one or more user devices indicating a preference for one of a plurality of data streams;

determining, by the server, a plurality of locations for each of the plurality of requests;

determining, by the server, whether data in the plurality of data streams are stored on the one or more user devices;

if the data is not located on the one or more user devices, then determining, by the server, a transmission medium, between at least an access network and a digital broadcast radio system, for each of the plurality of data streams, based at least in part on the plurality of data streams, the plurality of locations for each of the plurality of requests, and an available bandwidth of the access network, and transmitting, by the server, the data to the one or more user devices; and if the data is located on the one or more user devices, then transmitting, by the server, one or more signals for activating the data on the one or more user devices.

22. The method of claim 21 further comprising transmitting each of the plurality of data streams to the digital broadcast radio system.

23. The method of claim 21 further comprising transmitting each of the plurality of data streams to a second server based at least in part on a physical location of the second data server.

24. The method of claim 21 further comprising transmitting each of the plurality of data streams to a wireless broadcast radio system.

* * * * *